(12) United States Patent
Pandojirao-S et al.

(10) Patent No.: US 9,056,432 B2
(45) Date of Patent: Jun. 16, 2015

(54) HIGH-DENSITY MASK FOR THREE-DIMENSIONAL SUBSTRATES AND METHODS FOR MAKING THE SAME

(75) Inventors: Praveen Pandojirao-S, Jacksonville, FL (US); James Daniel Riall, St. Johns, FL (US); Adam Toner, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 161 days.

(21) Appl. No.: 13/455,209

(22) Filed: Apr. 25, 2012

(65) Prior Publication Data

US 2013/0284691 A1    Oct. 31, 2013

(51) Int. Cl.
| | | |
|---|---|---|
| C23F 1/00 | (2006.01) | |
| B29C 33/00 | (2006.01) | |
| B23P 17/00 | (2006.01) | |
| B29D 11/00 | (2006.01) | |
| B29C 59/14 | (2006.01) | |
| B29C 59/16 | (2006.01) | |

(52) U.S. Cl.
CPC ..... B29D 11/00163 (2013.01); *Y10T 29/49995* (2015.01); *B29C 33/0022* (2013.01); *B29C 59/14* (2013.01); *B29C 59/16* (2013.01)

(58) Field of Classification Search
None
See application file for complete search history.

(56) References Cited

U.S. PATENT DOCUMENTS

| | | | | |
|---|---|---|---|---|
| 3,900,359 A | * | 8/1975 | Bakewell | 156/242 |
| 3,944,867 A | * | 3/1976 | Kaplan | 313/403 |
| 4,587,455 A | * | 5/1986 | Falce et al. | 313/346 DC |
| 4,680,500 A | * | 7/1987 | Buck | 313/348 |
| 4,702,574 A | | 10/1987 | Bawa | |
| 5,259,926 A | | 11/1993 | Kuwabara et al. | |
| 5,470,651 A | * | 11/1995 | Milinkovic et al. | 428/325 |
| 5,567,554 A | | 10/1996 | Jensen et al. | |
| 5,772,864 A | * | 6/1998 | Møller et al. | 205/73 |
| 5,976,340 A | * | 11/1999 | Sheldon et al. | 205/70 |
| 6,162,564 A | | 12/2000 | Hieda et al. | |
| 2002/0158562 A1 | * | 10/2002 | Okamoto et al. | 313/407 |
| 2004/0140578 A1 | | 7/2004 | Kelly et al. | |
| 2005/0074616 A1 | | 4/2005 | Harchanko et al. | |
| 2006/0113054 A1 | | 6/2006 | Silvestrini | |
| 2012/0298624 A1 | * | 11/2012 | Cowan et al. | 216/41 |
| 2014/0030542 A1 | * | 1/2014 | Adams et al. | 428/603 |

FOREIGN PATENT DOCUMENTS

| | | |
|---|---|---|
| EP | 0816038 A | 1/1998 |
| EP | 1629961 B1 | 4/2008 |
| EP | 2319672 A1 | 5/2011 |
| WO | WO 02/14078 A2 | 2/2002 |

OTHER PUBLICATIONS

European Search Report dated Aug. 26, 2013 for Application No. EP13165414.
Singapore Search Report dated Jan. 23, 2014 for Application No. 201301410-5.
Office Action issued by the Russian Patent Office for corresponding Patent Application No. 2013119135/28.

* cited by examiner

*Primary Examiner* — Allan Olsen
(74) *Attorney, Agent, or Firm* — Carl J. Evens

(57) ABSTRACT

A method for fabricating high-density masks for non-planar or three-dimensional substrates utilizes a mandrel having one or more precision forms machined therein. Once the mandrel with one or more forms is fabricated, one or more mask blanks may be constructed thereon. The final masks may be cut from one or more mask blanks.

2 Claims, 7 Drawing Sheets

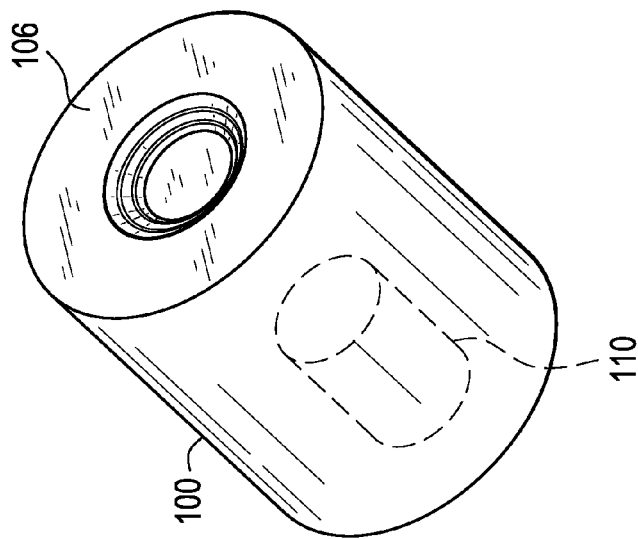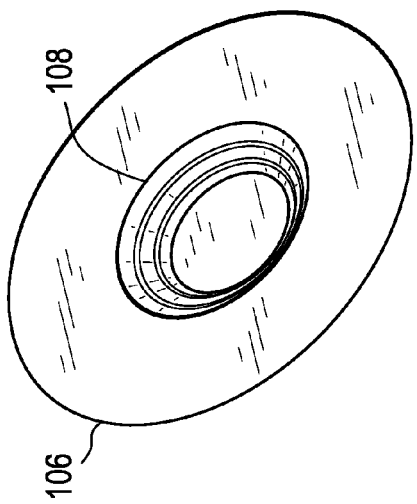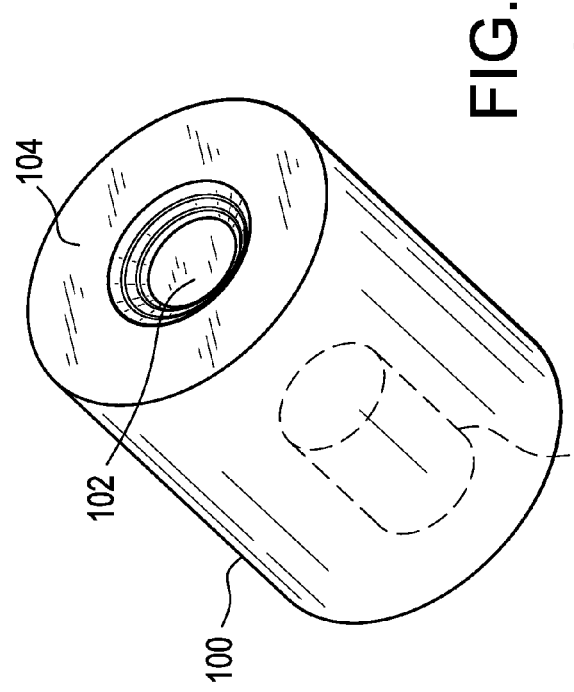

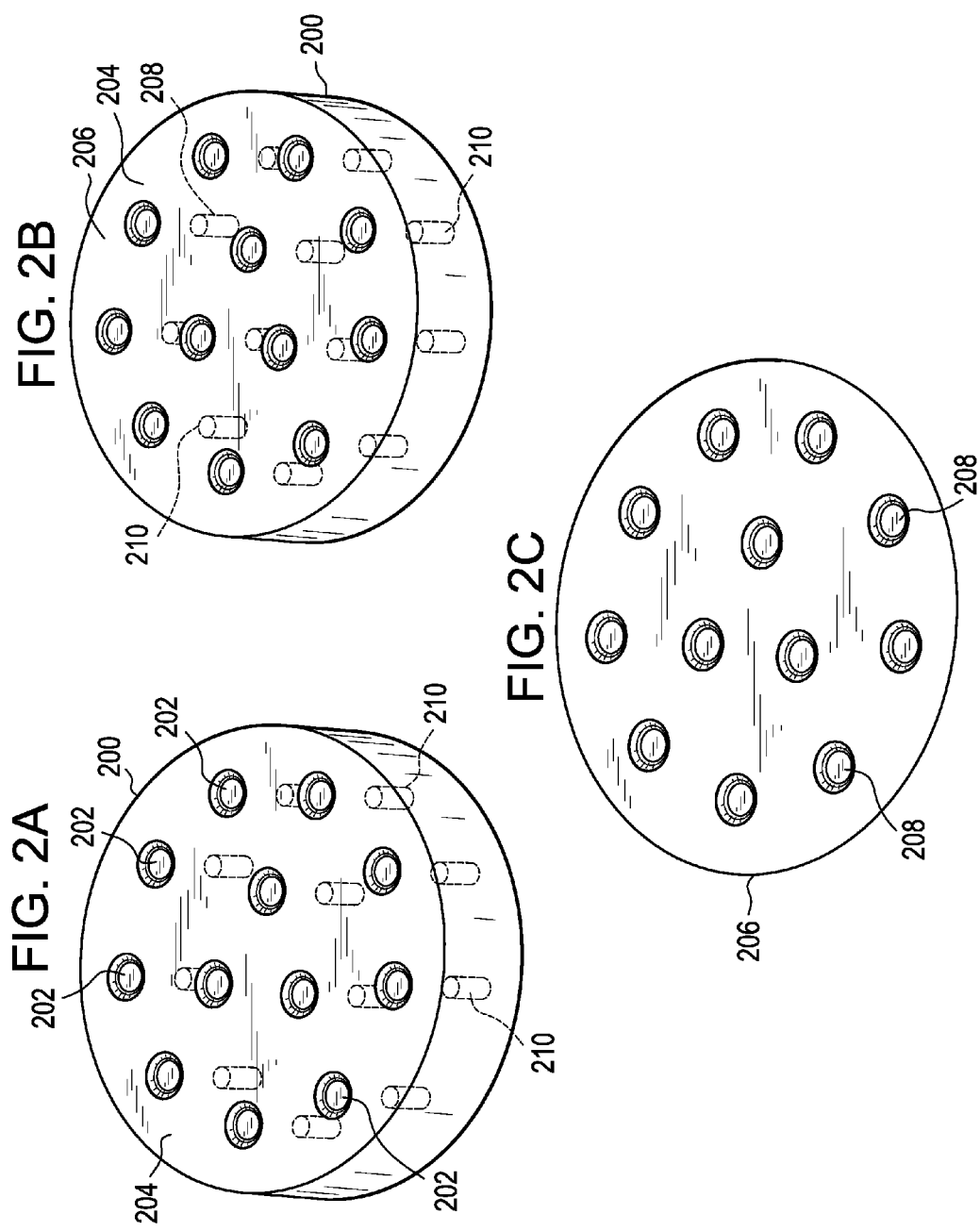

HIGH-DENSITY MASK FOR THREE-DIMENSIONAL SUBSTRATES AND METHODS FOR MAKING THE SAME

BACKGROUND OF THE INVENTION

1. Field of the Invention

The present invention relates to masks and devices and methods for fabricating masks, and more particularly to precision masks for complex, three-dimensional substrates with extreme tolerances and devices and methods for fabricating these high-density, precision masks.

2. Discussion of the Related Art

As electronic devices continue to be miniaturized, it is becoming increasingly more likely to create wearable or embeddable microelectronic devices for a variety of uses. Such uses may include monitoring aspects of body chemistry, administering controlled dosages of medications or therapeutic agents via various mechanisms, including automatically, in response to measurements, or in response to external control signals, and augmenting the performance of organs or tissues. Examples of such devices include glucose infusion pumps, pacemakers, defibrillators, ventricular assist devices and neurostimulators. A new, particularly useful field of application is in ophthalmic wearable lenses and contact lenses. For example, a wearable lens may incorporate a lens assembly having an electronically adjustable focus to augment or enhance performance of the eye. In another example, either with or without adjustable focus, a wearable contact lens may incorporate electronic sensors to detect concentrations of particular chemicals in the precorneal (tear) film. The use of embedded electronics in a lens assembly introduces a potential requirement for communication with the electronics, for a method of powering and/or re-energizing the electronics, for interconnecting the electronics, for internal and external sensing and/or monitoring, and for control of the electronics and the overall function of the lens.

The human eye has the ability to discern millions of colors, to adjust easily to shifting light conditions, and transmit signals or information to the brain at a rate exceeding that of a high-speed internet connection. Lenses, such as contact lenses and intraocular lenses, currently are utilized to correct vision defects such as myopia, hyperopia and astigmatism. However, properly designed lenses incorporating additional components may be utilized to enhance vision as well as to correct vision defects.

Conventional contact lenses are polymeric structures with specific shapes to correct various vision problems as briefly set forth above. To achieve enhanced functionality, various circuits and components have to be integrated into these polymeric structures. For example, control circuits, microprocessors, communication devices, power supplies, sensors, actuators, light emitting diodes, and miniature antennas may be integrated into contact lenses via custom-built optoelectronic components to not only correct vision, but to enhance vision as well as provide additional functionality as is explained herein. Electronic and/or powered contract lenses may be designed to provide enhanced vision via zoom-in and zoom-out capabilities or just simply modifying the refractive capabilities of the lenses. Electronic and/or powered contact lenses may be designed to enhance color and resolution, to display textural information, to translate speech into captions in real time, to offer visual cues from a navigation system, to provide image processing and internet access. The lenses may be designed to allow the wearer to see in low light conditions. The properly designed electronics and/or arrangement of electronics on lenses may allow for projecting an image onto the retina, for example, without a variable focus optic lens, provide novelty image displays and even provide wakeup alerts. Alternately, or in addition to any of these functions or similar functions, the contact lenses may incorporate components for the noninvasive monitoring of the wearer's biomarkers and health indicators. For example, sensors built into the lenses may allow a diabetic patient to monitor blood sugar levels by analyzing components of the tear film without the need for drawing blood. In addition, an appropriately configured lens may incorporate sensors for monitoring cholesterol, sodium and potassium levels as well as other biological markers. This, coupled with a wireless data transmitter, could allow a physician to have almost immediate access to a patient's blood chemistry without the need for the patient to waste time getting to a laboratory and having blood drawn. In addition, sensors built into the lenses may be utilized to detect light incident on the eye to compensate for ambient light conditions or for use in determining blink patterns.

The proper combination of devices could yield potentially unlimited functionality; however, there are a number of difficulties associated with the incorporation of extra components on a piece of optical-grade polymer. In general, it is difficult to manufacture such components directly on the lens for a number of reasons, and it is difficult to mount and interconnect planar devices on a non-planar surface. It is also difficult to manufacture to scale. The components to be placed on or in the lens need to be miniaturized and integrated onto just approximately 1.5 square centimeters of a transparent polymer while protecting the components from the liquid environment on the eye. It is also difficult to make a contact lens comfortable and safe for the wearer with the added thickness of additional components.

Given the area and volume constraints of an ophthalmic device such as a contact lens, and the environment in which it is to be utilized, the physical realization of the device must overcome a number of problems, including mounting and interconnecting a number of electronic components on a non-planar surface, the bulk of which comprises optic plastic. Accordingly, there exists a need to form three-dimensional shapes and to metalize or otherwise form interconnects and offsets on these three-dimensional shapes with a high degree of precision and repeatability.

SUMMARY OF THE INVENTION

The high-density masks for three-dimensional substrates and the methods for making the high-density masks of the present invention overcome the difficulties as briefly set forth above.

In accordance with a first aspect, the present invention is directed to a method for making one or more shadow masks for use in conjunction with a non-planar substrate. The method comprises the steps of fabricating a mandrel including one or more forms machined therein, the one or more forms corresponding to the shape of a non-planar substrate to be masked, forming one or more shadow mask blanks in the one or more forms in the manderel, removing the one or more shadow mask blanks from the mandrel, and machining a predetermined pattern into the one or more shadow mask blanks to form one or more shadow masks, the predetermined pattern including features for a predetermined application.

In accordance with another aspect, the present invention is directed to a mandrel for forming shadow mask blanks. The mandrel comprises a first face and a second face, the first and second faces being substantially parallel, one or more attachment mechanisms cooperatively associated with the first face of the substantially cylindrical structure, the one or more attachment mechanisms being configured to secure the mandrel to a machining tool, and one or more forms machined into the second face of the substantially cylindrical structure, the one or more forms having a non-planar pattern matching a non-planar substrate to be masked.

Masks, which create regions that are blocked and regions that are open to form a predetermined pattern, are useful devices in the processes utilized to form interconnections on non-planar or three-dimensional surfaces or substrates. In a general sense, simple masks which allow for the deposition of a material in predetermined regions of a three-dimensional substrate may result in the optimization of the subsequent material removal processes that are utilized to form the particular features, for example, electrical interconnects on a powered ophthalmic device. This particular application or use of masks is of limited sophistication; namely, to block or expose large regions and this is due mainly because of the quality of the masks. However, in accordance with the devices and methods of the present invention, precision masks may be fabricated which in turn may be utilized to form detailed features on highly complex, three-dimensional substrates such as may be utilized in powered ophthalmic applications.

The method of fabricating a mask or shadow mask in accordance with the present invention comprises a number of steps. The first step comprises manufacturing or creating a mandrel. The mandrel preferably comprises one or more forms or form wells that are created to represent the desired internal profile and features of the item or element to be masked. The next step in fabricating a mask or shadow mask in accordance with the present invention involves the fabrication of one or more shadow mask blanks in the one or more forms in the mandrel. Shadow mask blanks become the shadow masks after the desired pattern is cut or machined into the shadow mask blanks. The one or more shadow mask blanks may be fabricated utilizing any number of suitable techniques such as deposition processes, including electroforming. The next and final step in the process of fabricating a mask or shadow mask in accordance with the present invention involves the removal of the plate comprising the one or more shadow mask blanks from the mandrel and forming the patterns therein to create the specific shadow mask. Forming the patterns may be accomplished utilizing any number of precision machining processes, including laser ablation.

The mandrel fabricated and/or utilized in accordance with the present invention may comprise one or more forms corresponding precisely with the three-dimensional substrates to be masked, and these forms may be configured in a number of ways. For example, the configuration of the one or more forms on the mandrel may be arranged to increase the density of the forms. In other words, the configuration of the forms on the mandrel may be modified to increase the number of designs on a single mandrel. The configuration of the forms on the mandrel may also be modified to increase the repeatability in the process. In other words, the configuration of the mandrel may be modified to increase the ease of removing the shadow mask blank from the mandrel. It is important to note that numerous other configurations may be utilized to achieve a wide variety of functions.

The precision of the mask is determined primarily by the precision of the form in the mandrel. The form in the mandrel preferably conforms exactly to the shape of the three-dimensional substrates. Accordingly, the process utilized in the present invention enables the forms to be machined into the mandrel with a very high degree of precision. In addition, the mandrel is preferably designed to increase the efficiency of the overall process as well.

The high-density masks and the process for fabricating high-density masks in accordance with the present invention provide a means for masking detailed, non-planar or three-dimensional substrates to form precision features thereon without the need for additional post processing work. The masks and processes set forth herein provide a cost-effective and efficient means for fabricating detailed components.

BRIEF DESCRIPTION OF THE DRAWINGS

The foregoing and other features and advantages of the invention will be apparent from the following, more particular description of preferred embodiments of the invention, as illustrated in the accompanying drawings.

FIGS. 1A, 1B and 1C are diagrammatic representations of a first exemplary mandrel and with a single shadow mask blank in accordance with the present invention.

FIGS. 2A, 2B and 2C are diagrammatic representations of a second exemplary mandrel with multiple shadow mask blanks in accordance with the present invention.

DETAILED DESCRIPTION OF THE PREFERRED EMBODIMENTS

Figure 3A:
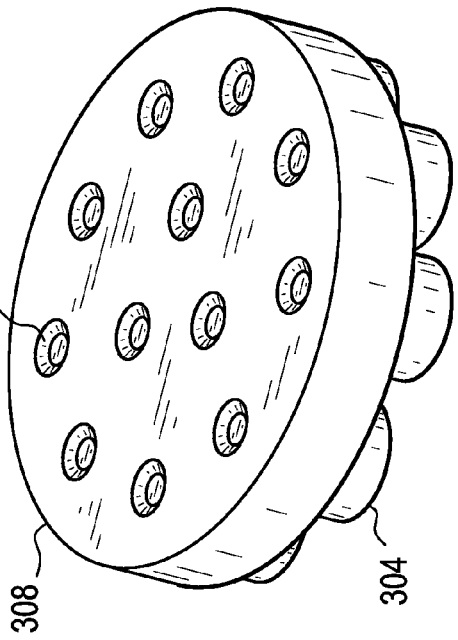
FIGS. 3A, 3B, 3C and 3D are diagrammatic representations of an exemplary mandrel assembly with multiple shadow mask blanks in accordance with the present invention.

As briefly set forth herein, masks, which create regions that are blocked and regions that are open to form a predetermined pattern, are useful devices in the processes utilized to form patterns, for example, electrical interconnections, on non-planar or three-dimensional surfaces or substrates. In many applications, the use of masks is of limited sophistication; namely, to block or expose large regions, and this is due mainly because of the quality of the masks. However, in accordance with the devices and methods of the present invention, precision masks may be fabricated which in turn may be utilized to form features such as interconnect features on highly complex, three-dimensional surfaces such as may be utilized in powered ophthalmic applications.

The first exemplary step in fabricating or creating a mask or shadow mask in accordance with the present invention involves the manufacturing of a mandrel. A mandrel has a number of different definitions, including an object utilized to shape machined work, a tool that holds or otherwise secures materials to be machined, or a tool that may be utilized to secure other moving tools. As used herein and as is explained in detail subsequently, a mandrel is a base form upon which a shadow mask may be fabricated. More specifically, the mandrel is the component in or on which one or more shadow masks blanks may be formed.

The exemplary mandrel comprises a substantially disc or cylindrical shaped structure with one or more shafts for attachment to a machine lathe or similar device on one planar face thereof, and a flat surface on the opposite planar face thereof. It is important to note that other attachment mechanisms other than attachment shafts for a standard machine lathe may be utilized in accordance with the present invention, including attachment mechanisms operable to work with machines comprising vacuum chucks. The exact pattern of the three-dimensional surface or substrate to be masked is duplicated one or more times, via any suitable machining technique for creating intricate and or complex geometries, on the flat surface of the mandrel. Essentially, once machined, the mandrel will comprise one or more patterns or forms representing the desired internal profile and features of the item to be masked. The pattern of the three-dimensional surface to be masked may be machined into the flat surface of the mandrel utilizing any suitable techniques for machining intricate patterns, including the use of a lathe, which explains the need for one or more shafts for attachment as is explained in detail herein.

Although the exemplary mandrel comprises a substantially disc or cylindrical shaped structure, it is important to note that it may comprise any suitable shape as long as a form may be machined therein. For example, a non-round structure may be utilized.

The size of the mandrel, the size of an individual shadow mask blank, and the desired number of shadow mask blanks to be fabricated on a single mandrel determines how many forms or form wells are machined into the flat surface of the mandrel. If only one form per mandrel is desired or required, the mandrel preferably comprises a cylindrical shaped structure rather than a disc like structure with a single attachment shaft centered on the opposite face of the mandrel. If, however, multiple forms or form wells are desired or required on a single mandrel, the mandrel preferably requires a disc shaped structure with a single attachment shaft positioned on the opposite face of the mandrel and centered behind each form or form well. For example, if thirteen (13) forms are machined into the mandrel, then thirteen (13) attachment shafts are required, with one centered directly behind each form. As set forth above, other attachment mechanisms may be utilized, for example, ones operable to work in conjunction with machines having vacuum chucks. This centering is required if the machining of the forms is to be done utilizing a rotating tool such as a lathe. With a rotating tool, in order for the form to be symmetric, the attachment shaft has to coincide with the center of the form. In addition to each form having its own centered attachment shaft, the mandrel is preferably formed from a lightweight material so that no wobble is introduced when machining a form away from the center of the mandrel, for example, near its perimeter, and strong enough to withstand the stresses, strains and wear of repeated uses. In one exemplary embodiment, the mandrel may be fabricated from a lightweight, high strength-to-weight ratio and relatively inexpensive metallic material such as aluminum. In addition, because aluminum may be easily machined or in an alternate embodiment, chemically dissolved, a complex form may be produced with near exactness.

In the exemplary embodiment set forth above, the one or more forms may be fabricated utilizing any number of techniques for fabricating precision and/or intricate/detailed features. As set forth above, a lathe or other turning machine such as a turn-mill and a rotary transfer, may be equipped with natural or synthetic diamond tipped tools to fabricate the one or more forms in a process known as diamond point turning. Diamond point turning is a multi-stage process, wherein the initial stages of machining are carried out utilizing a series of computer numerical control lathes. Each successive lathe in the series is more accurate than the last. In the final step of the series, a diamond tipped tool is utilized to achieve sub-nanometer level surface finishes and sub-micrometer form accuracies. In an alternate exemplary embodiment, the one or more forms may be fabricated utilizing electro-discharge machining. Electro-discharge machining is a manufacturing process wherein a predetermined shape is obtained utilizing electrical discharges to remove material, thereby creating the predetermined shape or form.

The next exemplary step in fabricating or creating a mask or shadow mask in accordance with the present invention involves the fabrication of one or more shadow mask blanks in the one or more forms or form wells in the mandrel. Shadow mask blanks become the shadow masks after the desired pattern is cut into the shadow mask blank as is explained in detail subsequently. Since the one or more forms precisely match the three-dimensional surface or substrate to be masked, the forms in the mandrel are the molds for the shadow mask blanks. In accordance with one exemplary embodiment of the present invention, a shadow mask blank may be fabricated in each form in the mandrel by an electroplating or electroforming process. Electroforming is a metal forming process wherein thin parts are fabricated utilizing an electroplating process. Electroforming is utilized when the part to be fabricated has extreme tolerances or complexity. Electroplating is a process in which metal ions in a solution are moved by an electric field to coat or plate a metal skin onto a base form which is then removed from the form after the plating is complete. Because of the nature of the process, high fidelity structures may be produced with this technique. In other words, electroforming reproduces the form exactly without any shrinkage or distortion. Any number of metallic materials may be utilized to fabricate the shadow mask blank. In an exemplary embodiment, the shadow mask blank is fabricated from nickel with a total thickness of between about fifty (50) microns to about one hundred-fifty (150) microns. It is important to note that the thickness of the shadow mask blank may vary depending on the application and thus the process to form the shadow mask blank may change from electroforming to another suitable process.

The next and final exemplary step in fabricating or creating a mask or shadow mask in accordance with the present invention involves the removal of the plate of the one or more shadow mask blanks from the mandrel and forming the patterns therein to create the shadow mask. The plate may be removed from the mandrel in a number of ways, including the chemical removal of the mandrel or physical separation of the two components. In accordance with one exemplary embodiment of chemical removal of the mandrel, the mandrel itself may be dissolved with a chemical that only reacts with the mandrel and not the plate. In the exemplary embodiment, the shadow mask blanks are physically separated from the mandrel manually or via robotic manipulators and placed in a fixture for further processing, including creating the shadow masks by forming the desired pattern therein. To facilitate physical separation, the mandrel may be shaken, vibrated, tapped or otherwise agitated to create physical separation. The desired pattern corresponds to the particular application, for example, electrical interconnects. The pattern may be formed in any suitable manner utilizing any suitable means, including laser machining, laser ablation, plasma etching, and/or chemical etching. In an exemplary embodiment, the pattern is formed in the shadow mask blank by laser micromachining. Accordingly, once the shadow mask blanks are removed from the mandrel, they are placed on a holding fixture that is compatible with the laser machining system. The precision of currently available laser systems makes the micromachining of extremely intricate patterns possible. For example, feature pattern widths of as small as one (1) micron may be achieved.

Once the one or more shadow masks are complete, they are transferred from the laser micromachining fixture to a fixture or arrangement for mounting or temporarily securing them to the surface or substrate that is to be masked to create a final product. For example, if the final product is to be utilized as the substrate for electrical interconnects on an insert for a powered contact lens, then the shadow mask may be secured to the front optic by a specialized fixture that would allow for the interconnect material to be deposited onto the substrate through the openings in the shadow mask. Any suitable deposition process may be utilized that is compatible with the substrate.

Referring to FIGS. 1A, 1B and 1C, there is illustrated an exemplary mandrel 100 having a single form or form well 102 machined into one planar face 104 thereof (FIG. 1A), the exemplary mandrel 100 with a shadow mask blank plate 106 including a single shadow mask blank 108 formed thereon (FIG. 1B), and the shadow mask blank plate 106 separated from the mandrel 100 (FIG. 1C). The shadow mask blank 108 may be, as set forth above, removed from the shadow mask blank plate 106 to form the shadow mask as is described in detail subsequently. The process utilized to fabricate the mask from the mask blank, for example, laser machining, may be utilized to remove the mask blank or mask form the shallow mask blank plate 106. In this exemplary embodiment, the mandrel 100 has a substantially cylindrical shape as only a single form 102 is machined therein. An attachment shaft 110 for securing the mandrel 100 to a lathe is illustrated in phantom. As set forth above, if another process, for example, electro-discharge machining, is utilized to machine the form 102, no attachment shaft is required. In the illustrated exemplary embodiment, the form 102 comprises a number of layers and faces that match the three-dimensional substrate upon which the mask is to be utilized. It is important to note that FIGS. 1A, 1B and 1C are for illustrative purposes and do not necessarily show the level of detail of an actual form. The mandrel 100 preferably comprises aluminum and the shadow mask blank 108 preferably comprises nickel. The shadow mask blank 108 and the shadow mask itself may be fabricated utilizing any suitable processes, including those described herein.

As set forth above, the mandrel may comprise any number of configurations, including a substantially disc shaped structure for forming multiple shadow mask blanks on a single shadow mask plate. FIGS. 2A, 2B and 2C illustrate an exemplary disc shaped mandrel 200 having multiple forms or form wells 202 machined into one planar face 204 thereof (FIG. 2A), the exemplary disc shaped mandrel 200 with a shadow mask blank plate 206 including multiple shadow mask blanks 208 formed thereon (FIG. 2B), and the shadow mask blank plate 206 separated from the mandrel 200 (FIG. 2C). The multiple shadow mask blanks 208, which as illustrated is a high-density shadow mask blank, may be removed from the shadow mask blank plate 206 to form the shadow masks utilizing the same process as is utilized to fabricate the masks from the blanks, for example, laser machining. In this exemplary embodiment, the mandrel 200 has a substantially disc shape to accommodate the multiple forms 202 machined therein. The size of the forms 202, the number of forms 202 and the size of the mandrel 200 are all related to or dependent on one another. The multiple forms 202 may be arranged in any suitable configuration. The configuration may be modified for a number of reasons or to accommodate a number of design parameters. For example, the configuration may be modified to increase the density. In other words, the configuration may be modified to increase the number of designs on a mandrel. The configuration may also be modified to increase repeatability in the process. In other words, the configuration may be modified to increase the ease of removing the shadow mask blank from the mandrel. An attachment shaft 210 for securing the mandrel 200 to a lathe, illustrated in phantom, is centered behind each of the forms 202 on the opposite planar face. As set forth above, if another process, for example, electro-discharge machining, is utilized to machine the multiple forms 202, no attachment shafts are required. In the illustrated exemplary embodiment, the forms 202 each comprise identical patterns of layers and faces that match the three-dimensional substrate in which the masks are to be utilized; however, different forms may be utilized on a single mandrel. Once again, the mandrel 200 preferably comprises aluminum and the multiple shadow mask blanks 208 preferably comprise nickel. The shadow mask blanks 208 and the shadow masks themselves may be fabricated utilizing any suitable process, including those described herein. Once again, it is important to note that FIGS. 2A, 2B and 2C are for illustrative purposes and do not necessarily reflect the level of detail in an actual form.

Figure 3B:
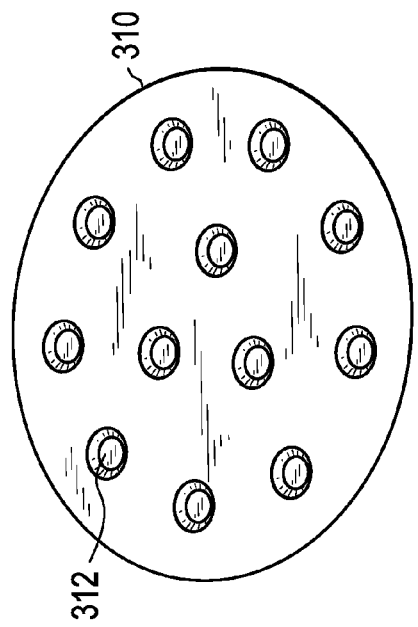
Figure 3C:
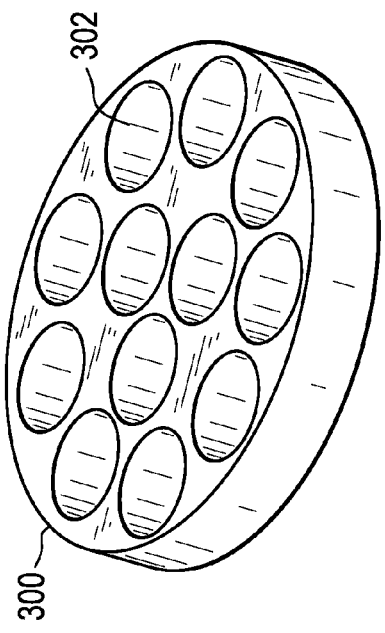
Figure 3D:
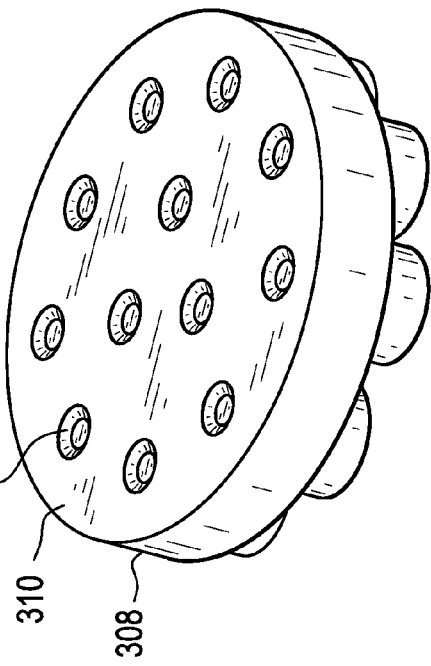

In accordance with an alternate exemplary embodiment, certain features from both of the above described exemplary embodiments may be combined into a single new design. FIGS. 3A, 3B, 3C and 3D illustrate this alternate exemplary mandrel assembly design. FIG. 3A illustrates a substantially disc shaped structure 300 comprising a plurality of through-hole openings 302 therein. This substantially disc shaped structure 300 may be fabricated from any number of materials, including aluminum, as described above. The through-hole openings 302 are sized to accept single mandrel structures 304 with a single form or form well 306 therein. The single mandrel structure 304 may be identical to those illustrated, in FIGS. 1A and 1B. Essentially, the combination of the substantially disc shaped structure 300 and the single mandrel structure 304 form a mandrel assembly 308. The single mandrel structure 304 and the substantially disc shaped structure 300 may comprise any suitable means for removably attaching to one another, for example, via threads. By having the elements interconnected in this manner, various forms 306 may be incorporated into a single mandrel assembly 308. In other words, on a single assembly, different forms may be utilized to create different mask blanks. FIG. 3C illustrates the mandrel assembly 308 with a shadow mask blank plate 310 and associated shadow mask blanks 312, and FIG. 3D illustrates the shadow mask blank plate 310 separated from the mandrel assembly 308. As set forth above, it is important to note that FIGS. 3A, 3B and 3C are for illustrative purposes and do not necessarily reflect the level of detail in an actual form.

Although no shaft is illustrated in phantom in the mandrel of FIGS. 3B and 3C, some attachment means is preferably utilized to fabricate the mandrel. For example, a single shaft for attachment to a lathe or a vacuum chuck may be utilized.

Figure 4:
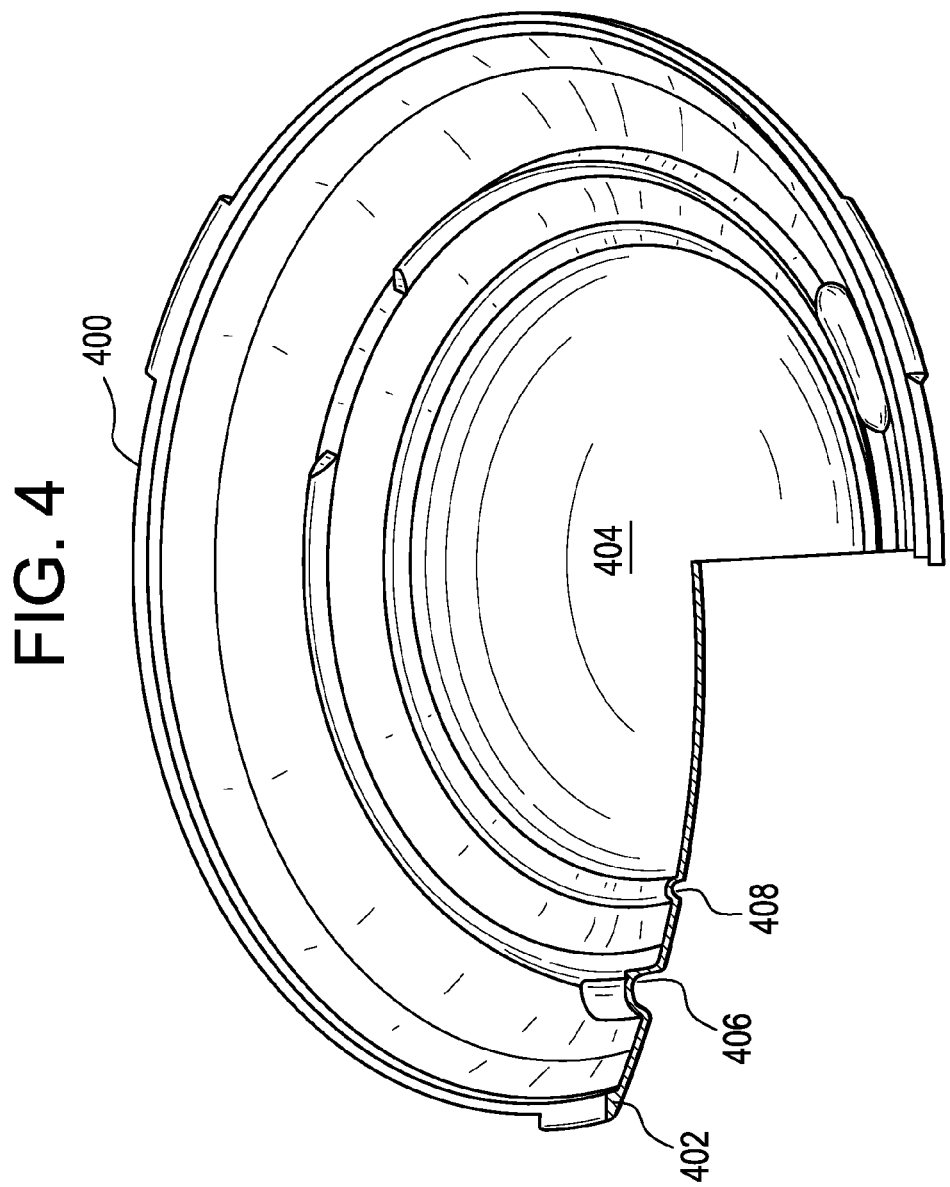
FIG. 4 is a diagrammatic representation of an exemplary three-dimensional substrate with surfaces upon which interconnections may be configured utilizing a mask in accordance with the present invention.

The shadow mask of the present invention may be utilized on any number of substrates, including three-dimensional substrates. FIG. 4 illustrates on such exemplary substrate 400. The substrate 400 may, as set forth above, be a component of an ophthalmic device or system, for example, a variable-optic electronic ophthalmic lens. FIG. 4 illustrates a number of attributes of the three-dimensional aspect of the substrate 400 by depicting a cross-sectional cut across a portion of the substrate 400. The substrate 400 comprises an outer portion or edge 402, a central portion or central zone 404, and intermediate features 406 and 408. As shown, each of these intermediate features 406 and 408 has its own localized three-dimensional topology. In exemplary embodiments wherein the substrate 400 may be utilized in an ophthalmic lens, the difference in height from the edge zone 402 to the central zone 404 may be up to four (4) millimeters, and the intermediate features 406 and 408 may have localized height differences that vary between 0.001 to 0.5 millimeters with the slopes of the sidewalls thereof varying from about two (2) to about ninety (90) degrees. While a description of the exemplary embodiment which focuses on a substrate 400 for an ophthalmic device may be useful in describing the mask and method of making the mask in accordance with the present invention, it should be readily apparent to one of ordinary skill in the art that essentially any three-dimensional substrate is consistent with the shadow masks and methods for forming shadow masks as described herein. Of particular note; however, is the extremely detailed nature of a substrate for an ophthalmic device and thus the need for a mask and process for making a mask with such extreme tolerances.

Figure 5:
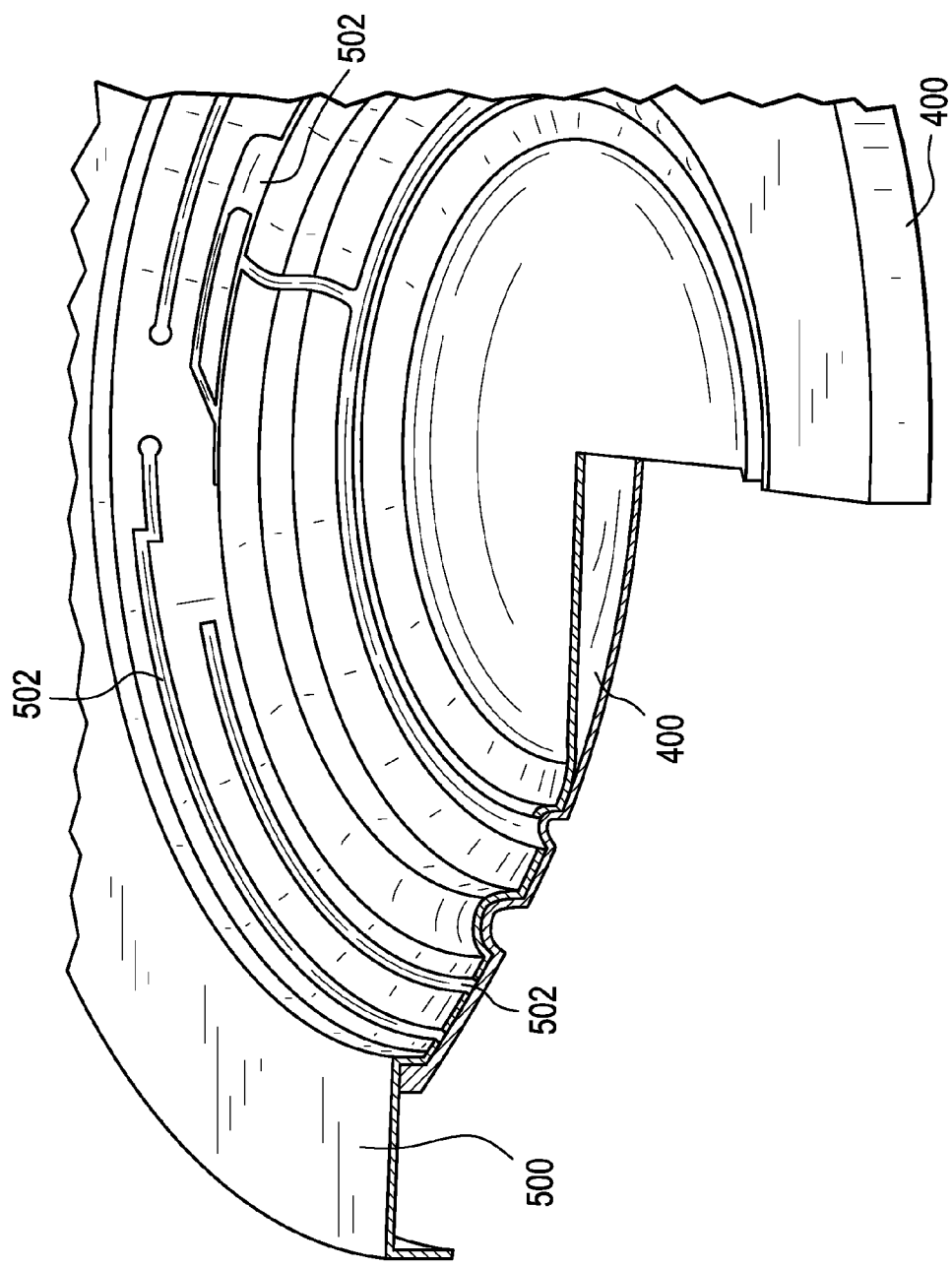
FIG. 5 is a diagrammatic representation of an exemplary shadow mask positioned on the substrate illustrated in FIG. 4 in accordance with the present invention.

Any shadow mask fabricated in accordance with the present invention for this substrate 400 preferably conforms to the precise shape of the substrate 400. In other words, a shadow mask prepared in accordance with the present invention should preferably conform to the shape of the substrate and be positioned as close, surface to surface, to the substrate as possible. Referring to FIG. 5, there is illustrated an exemplary shadow mask 500 positioned on the substrate 400. The shadow mask 500 conforms to the shape of the particular substrate 400 and comprises cutouts 502 wherever the deposition of material onto the substrate 400 is required. The shadow mask 500 may be utilized in conjunction with any number of deposition techniques as set forth herein. If, as described above, the substrate 400 is a component of an ophthalmic device, then the shadow mask 500 may be utilized to form conductive traces/interconnects on the substrate 400. The cutouts 502 in the shadow mask 500 should preferably correspond to the desired pattern for the conductive traces/interconnects.

Once the shadow mask 500 with its associated cutouts 502 is positioned and aligned upon its matching three-dimensional substrate 400, the shadow masking process is complete and any suitable techniques for thin film formation may be utilized, including sputter deposition of a gold film. Although a gold film is set forth in this exemplary description, it should be noted that numerous films which are consistent with masked deposition may be utilized, including metallic films, dielectric films, high-k dielectric films, conductive and non-conductive films.

Figure 6:
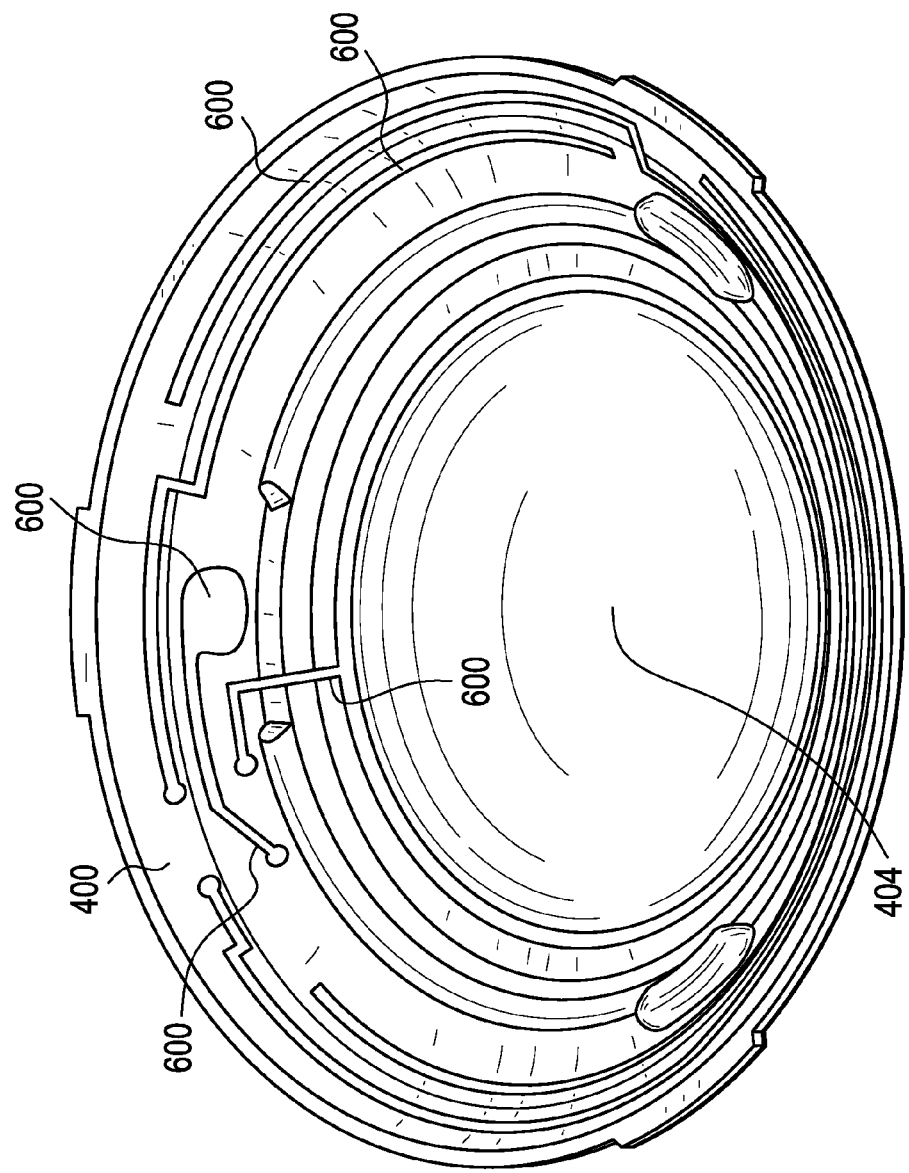
FIG. 6 is a diagrammatic representation of the substrate illustrated in FIG. 4 with interconnections deposited thereon utilizing a shadow mask in accordance with the present invention.

After the deposition process has been performed to deposit an appropriate thickness of gold film onto the substrate 400 in regions corresponding to the cutouts 502 as well as on the shadow mask 500 itself, a resulting substrate 400 with directly formed conductive traces/interconnections 600 is formed, as illustrated in FIG. 6. The shadow mask 500 has directly shadowed the three-dimensional substrate 400 in regions where conductive traces/interconnections are not required. In the regions corresponding to the cutouts 502, however, conductive traces/interconnect features 600 are formed upon the surface of the substrate 400.

After the conductive traces/interconnect features 600 have been defined in the manner described, in some exemplary embodiments laser ablation processing may again be used. If the conductive traces/interconnect features 600 defined by a shadow mask 500 are not of a precision that may be obtained with laser ablation, the defined conductive traces/interconnect features 600 may be "trimmed" or further defined through the use of laser ablation. In some exemplary embodiments, such trimming may result in improvements in throughput, since features very close to the desired finished product may be formed by shadow masking and then changed in small manners by laser ablation.

While the masks and methods for making masks in accordance with the present invention may be utilized on any substrate, exemplary embodiments have been described with reference to a substrate which may be a component of an ophthalmic device or system. One such ophthalmic device or system is a powered or electronic contact lens. Accordingly, for completeness, a brief description of an exemplary powered or electronic contact lens is set forth herein.

An exemplary powered or electronic contact lens comprises the necessary elements to correct and/or enhance the vision of patients with one or more vision defects or otherwise perform a useful ophthalmic function. In addition, they may be utilized simply to enhance normal vision or provide a wide variety of functionality. The electronic contact lens may comprise a variable focus optic lens, an assembled front optic embedded into a contact lens or just simply embedding electronics without a lens for any suitable functionality. The exemplary electronic lens may be incorporated into any number of contact lenses; however, for ease of explanation, the disclosure will focus on an electronic contact lens to correct vision defects intended for single-use daily disposability.

Figure 7:
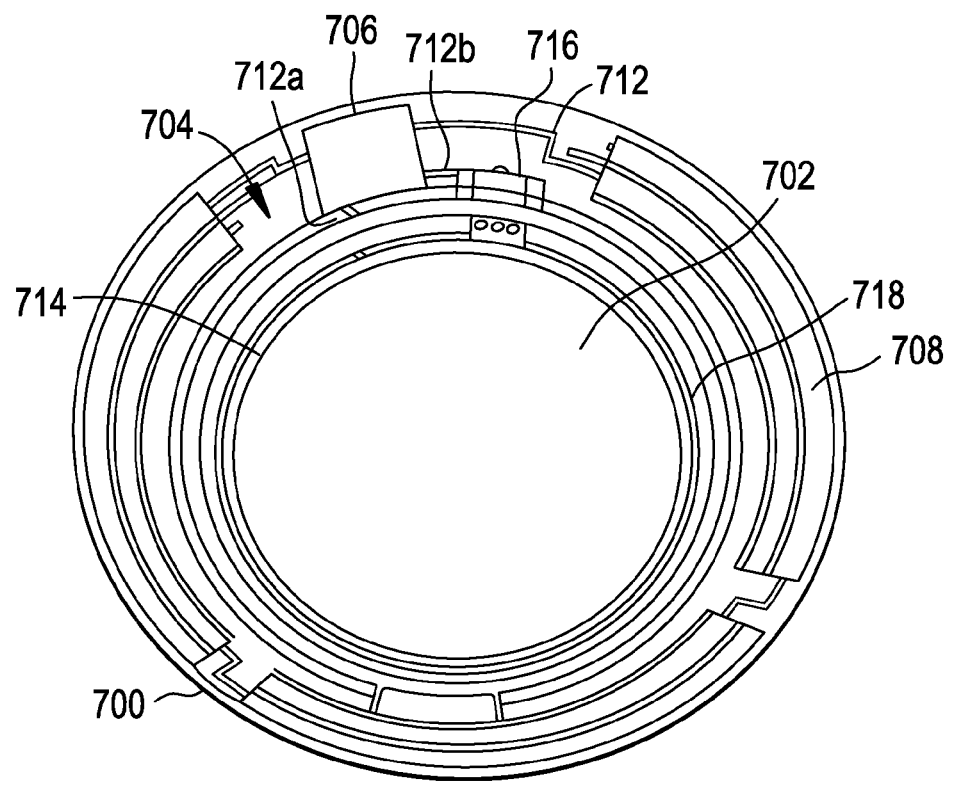
FIG. 7 is a diagrammatic representation of a contact lens comprising both optics and electronics.

Referring now to FIG. 7, there is illustrated a contact lens 700 that comprises both optical and electronic components such that electrical and mechanical interconnects are required. The contact lens 700 comprises an optic zone 702 which may or may not be functional to provide vision correction and/or enhancement, or alternately, it may simply serve as a substrate for the embedded electronics for any suitable functionality. In the illustrated exemplary embodiment, the polymer/plastic forming the optic zone 702 is extended such that it forms a substrate 704 upon which the electronics are attached. Electronic components such as semiconductor die 706 and batteries 708 connect both mechanically and electrically to the substrate 704. Conductive traces 712 electrically interconnect the electronic components 706 and 708 on the substrate 704. In the exemplary embodiment illustrated, conductive trace 712a connects semiconductor die 706 to the front optic electrode 714, and conductive trace 712b connects semiconductor die 706 to the back optical electrode 716. An adhesive layer 718 may be utilized to connect the front and back optics; however, any other suitable means for joining the two layers may be utilized or the design may only utilize a single layer.

The conductive traces 712 described above are preferably fabricated utilizing the mask and masking techniques described herein. The conductive traces 712 correspond to the openings in the shadow mask. In order to have precision conductive traces 712, the mask must have precision cutouts as well as correspond to the three-dimensional surface or substrate. In other words, the mask preferably mirrors the substrate or surface and the cutouts precisely match the features such that additional processing steps are not required. In other words, with a mask fabricated in accordance with the present invention, no further processing should be required to "clean-up" the deposited feature pattern. For example, if a prior art mask were utilized, a laser ablation process may be required to clean up the lines of the deposited feature pattern (conductive interconnect traces), whereas with the present invention, the precise nature of the mask allows cleaner and more precise lines.

Although shown and described is what is believed to be the most practical and preferred embodiments, it is apparent that departures from specific designs and methods described and shown will suggest themselves to those skilled in the art and may be used without departing from the spirit and scope of the invention. The present invention is not restricted to the particular constructions described and illustrated, but should be constructed to cohere with all modifications that may fall within the scope of the appended claims.

What is claimed is:

1. A method for making one or more shadow masks for use in conjunction with a non-planar substrate, the method comprising the steps of:
    fabricating a mandrel including one or more forms machined therein by diamond point turning to create sub-nanometer level surface finishes and sub-micrometer form accuracies, the one or more forms corresponding to the shape of a non-planar substrate to be masked;
    forming, via electroforming, one or more shadow mask blanks in the one or more forms in the mandrel utilizing nickel;
    removing the one or more shadow mask blanks from the mandrel; and
    laser micromaching a predetermined pattern into the one or more shadow mask blanks to form one or more shadow masks, the predetermined pattern including features for a predetermined application.

2. The method for making one or more shadow masks according to claim 1, wherein the step of fabricating a mandrel comprises making a substantially cylindrical structure having substantially parallel front and back faces, and machining one or more non-planar forms in the front face.

* * * * *